United States Patent
Curtis et al.

(10) Patent No.: US 10,462,178 B2
(45) Date of Patent: *Oct. 29, 2019

(54) SECURITY COUNTERMEASURE MANAGEMENT PLATFORM

(71) Applicant: Alert Logic, Inc., Houston, TX (US)

(72) Inventors: Michael S. Curtis, Coppell, TX (US);
Audian H. Paxson, Allen, TX (US);
Eva E. Bunker, Richardson, TX (US);
Nelson W. Bunker, Plano, TX (US);
Kevin M. Mitchell, Plano, TX (US)

(73) Assignee: Alert Logic, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,509

(22) Filed: Aug. 4, 2014

(65) Prior Publication Data

US 2014/0344940 A1    Nov. 20, 2014

Related U.S. Application Data

(63) Continuation of application No. 13/371,405, filed on Feb. 11, 2012, now Pat. No. 8,800,045.

(60) Provisional application No. 61/441,673, filed on Feb. 11, 2011.

(51) Int. Cl.
*H04L 29/06* (2006.01)
*G06F 21/57* (2013.01)

(52) U.S. Cl.
CPC ........ *H04L 63/1441* (2013.01); *G06F 21/577* (2013.01); *H04L 63/0263* (2013.01); *H04L 63/1433* (2013.01); *G06F 2221/2151* (2013.01)

(58) Field of Classification Search
CPC . H04L 63/1433; H04L 63/1441; H04L 9/002; H04L 63/16; H04L 63/0263; G06F 21/577
See application file for complete search history.

(56) References Cited

U.S. PATENT DOCUMENTS

| 8,201,257 B1 * | 6/2012 | Andres | G06F 21/568 726/23 |
| 8,312,540 B1 * | 11/2012 | Kahn | G06F 21/552 713/183 |
| 2003/0056116 A1 | 2/2003 | Bunker et al. | |
| 2003/0204632 A1 | 10/2003 | Willebeek-Lemair et al. | |

(Continued)

OTHER PUBLICATIONS

Wu et al. "A Survey of Attacks and Countermeasures in Mobile Ad Hoc Networks", 2007, pp. 103-135 http://www.springerlink.com/contentJm5226047k5qq4766/.*

Abbas et al., "A Comprehensive Approach to Designing Internet Security Taxonomy", May 2006, pp. 1316-1319 http://ieeexplore.ieee.org/xpls/abs_all.jsp7arnu mber=4054839&tag=1.*

Merriam-Webster., "Countermeasure", Merriam-Webster, date accessed Aug. 3, 2016 http://www.merriam-webster.com/dictionary/countermeasure.*

(Continued)

*Primary Examiner* — Shanto Abedin
*Assistant Examiner* — Carlos M De Jesus Lassala
(74) *Attorney, Agent, or Firm* — Intrinsic Law Corp.

(57) ABSTRACT

A management platform that allows security and compliance users to view risks and vulnerabilities in their environment with the added context of what other mitigating security countermeasures are associated with that vulnerability and that are applicable and/or available within the overall security architecture. Additionally, the platform allows users to take one or more actions from controlling the operation of a security countermeasure for mitigation purposes to documenting the awareness of a security countermeasure that is in place.

14 Claims, 10 Drawing Sheets

(56) References Cited

U.S. PATENT DOCUMENTS

| | | | |
|---|---|---|---|
| 2004/0221176 A1 | 11/2004 | Cole | |
| 2006/0085852 A1* | 4/2006 | Sima | G06F 21/552 726/22 |
| 2007/0016955 A1 | 1/2007 | Goldberg et al. | |
| 2008/0148398 A1* | 6/2008 | Mezack | G06F 21/55 726/22 |
| 2009/0030751 A1* | 1/2009 | Barve | G06Q 10/04 705/7.22 |
| 2009/0100077 A1 | 4/2009 | Jung et al. | |
| 2009/0276259 A1 | 11/2009 | Bliznack | |
| 2010/0242114 A1 | 9/2010 | Bunker et al. | |
| 2011/0154497 A1* | 6/2011 | Bailey, Jr. | H04L 63/0861 726/25 |
| 2011/0242114 A1 | 10/2011 | Blythe et al. | |

OTHER PUBLICATIONS

Tran et al., "An Approach to Select Cost-Effective Risk Countermeasure Exemplified in CORAS" Jan. 2013, pp. 1-38, https://arxiv.org/ftp/arxiv/papers/1302/1302.4689.pdf (Year: 2013).*

Phatak, "Vulnerability Protection—A Buffer for Patching," Feb. 2004.

Martin, "Managing Vulnerabilities in Networked Systems," IEEE 2001.

Abbas, et al, "A Comprehensive Approach to Designing Internet Security Taxonomy," May 2006.

Wu, et al, "A Survey of Attacks and Countermeasures in Mobile Ad Hoc Networks," Jan. 2007.

Chase et al, MAEC, The Mitre Corporation, 2009.

* cited by examiner

Vulnerability

MS10-1850
MySQL is an open source database server...

Published: 8/10/2010

CVE: 2010-1850

Risk Factor: High

Description: A buffer overflow vulnerability has been discovered in MySQL. This vulnerability could allow an attacker to execute arbitrary code. This application is prone to this vulnerability because of a failure to properly bounds-check user-supplied input, allowing an attacker to execute arbitrary code.

500

Impact
- Security Monitoring Failure
- Loss of Ability to Control Access

OR...

Using CVSS Scoring elements to incorporate C.I.A

501

Countermeasure Remediation - Enable IPS Filter - TippingPoint IPS (Internal Profile L.A.) — 502
Effectiveness
Cost
10 9 8 7 6 5 4 3 2 1 0

Countermeasure Remediation - CheckPoint Firewall rule change - Block untrusted access to port TCP 3306 — 504
Effectiveness
Cost
10 9 8 7 6 5 4 3 2 1 0

Applicable Countermeasure: Found - Host IPS : McAfee — 506
Effectiveness
Cost
10 9 8 7 6 5 4 3 2 1 0

Applicable Countermeasure: Found - DLP : Symantec — 508
Effectiveness
Cost
10 9 8 7 6 5 4 3 2 1 0

Applicable Countermeasure: Found - Database Encryption : Vormetric — 510
Effectiveness
Cost
10 9 8 7 6 5 4 3 2 1 0

Applicable Countermeasure: Not Found Active Server Logging - SIEM/Log Management - LogRythm, RSA Envision, Q1Labs, Tripwire, Arcsight — 512
Effectiveness
Cost
10 9 8 7 6 5 4 3 2 1 0

*FIG. 5*

FusionCMP

◇ Critical Watch │ +

Visibility, Measurability, Control

Home │ Taxonomy │ Risks │ Counter Measures │ Policy

Reports Manager

Fiction Inc. | 11:31 AM | Welcome John Smith! | My Account | Help | Logoff

Filtered by: Asset(s): Claims division, DMZ Risks Factor: High Business Impact: Loss of Systems, Data Corruption
Source: External Scanner, Internal Scanner, Catbird, Cenzic Hailstorm Save | Export
Select Columns

| | Risk | Name | Total | Mapping | Countermeasures |
|---|---|---|---|---|---|
| ☐ | + High | MySQL 5.0.51a - Unspecified Remote Code Execution Issue | 4 | 2 | 2 |
| ☐ | + High | MS10-005 - Microsoft Paint JPEG Image Processing Integer Overflow Issue | 3 | 2 | 0 |
| ☐ | + High | 2007-2446 - Samba Buffer Overflow Issue | 8 | 4 | 2 |
| ☐ | + High | 2010-2225 - PHP - Code Execution Issue | 2 | 6 | 1 |
| ☐ | + High | MySQL 5.0.51a - Unspecified Remote Code Execution Issue | 1 | 7 | 3 |
| ☐ | + High | Oracle - MySQL - Prior to 5.1.50 Privilege Escalation Issue | 1 | 2 | 2 |
| ☐ | + High | MS10-005 - Microsoft Paint JPEG Image Processing Integer Overflow Issue | 4 | 4 | 5 |
| ☐ | − High | 2010-1850 - MySQL - Buffer-overflow issue | 1 | 5 | 6 |

Description: A buffer overflow vulnerability has been discovered in MySQL. This vulnerability could allow an attacker to execute arbitrary code. This application is prone to this vulnerability because of a failure to properly bounds-check-users-supplied input, allowing an attacker to execute arbitrary code.

IP Address:        Host Name:    Source:              Job:
10.223-208.1    Dev06            Internal Scanner    Internal Assessments Security Monitoring Failure
Loss of Ability to Control Access IPS/IDS
   − TippingPoint IPS
Firewall
   − CheckPoint Firewall
HPS
   − McAfee
DLP
   − Symantec
Database Encryption
   − Vormetric
SIEM/Log Management
   − Not Available

*FIG. 6*

◆ Critical Watch

FusionCMP
Visibility, Measurability, Control

Home | Taxonomy | Risks | Counter Measures | Policy

Reports Manager
Fiction Inc. | 11:31 AM | Welcome John Smith! | My Account | Help | Logoff
Save | Export
Select Columns

Filtered by: Asset(s): Claims division, DMZ Risks Factor: High Business Impact: Loss of Systems, Data Corruption
Source: External Scanner, Internal Scanner, Catbird, Cenzic Hailstorm

| | Risk | Name | Total | Mapping | Countermeasures |
|---|---|---|---|---|---|
| ☐ | + High | MySQL 5.0.51a - Unspecified Remote Code Execution Issue | 4 | 2 | 2 |
| ☐ | + High | MS10-005 - Microsoft Paint JPEG Image Processing Integer Overflow Issue | 3 | 2 | 0 |
| ☐ | + High | 2007-2446 - Samba Buffer Overflow Issue | 8 | 4 | 2 |
| ☐ | + High | 2010-2225 - PHP - Code Execution Issue | 2 | 6 | 1 |
| ☐ | + High | MySQL 5.0.51a - Unspecified Remote Code Execution Issue | 1 | 7 | 3 |
| ☐ | + High | Oracle - MySQL - Prior to 5.1.50 Privilege Escalation Issue | 1 | 2 | 2 |
| ☐ | + High | MS10-005 - Microsoft Paint JPEG Image Processing Integer Overflow Issue | 4 | 4 | 5 |
| ☐ | - High | 2010-1850 - MySQL - Buffer-overflow issue | 1 | 5 | 6 |

Description: A buffer overflow vulnerability has been discovered in MySQL. This vulnerability could allow an attacker to execute arbitrary code. This application is prone to this vulnerability because of a failure to properly bounds-check-users-supplied input, allowing an attacker to execute arbitrary code.
IP Address:      Host Name:   Source:           Job:
10.223-208.1   Dev06          Internal Scanner   Internal Assessments Security Monitoring Failure | IPS/IDS
Loss of Ability to Control Access | - TippingPoint IPS This exposure has Mitigating TippingPoint Filter:
2002 MySQL: MySQL COM_FIELD_LIST Command Buffer Overflow This filter detects an attempt to exploit a buffer overflow vulnerability in MySQL. By sending crafted messages, a remote attacker with sufficient privileges can execute arbitrary code with the permissions of the user running MySQL.

Apply Filter   Add to Collection

*FIG. 7*

SECURITY COUNTERMEASURE MANAGEMENT PLATFORM

TECHNICAL FIELD

This disclosure relates generally to risk assessment and compliance management in an enterprise computing environment.

BACKGROUND OF THE RELATED ART

While the security and compliance world is fast maturing, the promise of fully-automated security solutions remains far out on the horizon. Even today, with the creation of standards like Open Vulnerability and Assessment Language (OVAL) and Security Content Automation Protocol (SCAP), the vulnerability management process is a challenging one, often involving manual efforts with less than perfect information on which to prioritize effort. This means the fundamental process of assessing risk and compliance against policies will not go away anytime soon.

In today's environment, vulnerability management is often a separate, isolated task within the security operations landscape. Vulnerability management tasks typically comprise scanning the computing environment or otherwise collecting asset risk information, identifying vulnerabilities, and then attempting to remediate discovered risk or documenting exceptions when risks are accepted or cannot be directly addressed via applying software patches (or so-called "patching"). Vulnerability assessment still largely revolves around this scan-and-patch paradigm, although there are numerous operational and business obstacles that make it difficult to simply patch or otherwise directly mitigate every discovered issue. Indeed, this process is expensive and time-consuming and therefore often left incomplete, which creates exposure for the enterprise.

A typical enterprise security infrastructure comprises tools and technologies at multiple OSI layers (namely, transport, data, application, network, and the like) that—at least theoretically—combine to provide an overall level of protection for an enterprise. In practice, however, it is very difficult to drive a consistent, complete risk assessment process spanning network, application and web layers from pre-production software development through to standard operating systems, off-the-shelf software and network devices. This is because these tools operate in different worlds and involve differing mitigation strategies. Although some converged security solutions are emerging, most enterprises have numerous security products deployed that address varying types of risks and threats operating at a specific layer throughout their defense in depth model. As a result, most enterprises typically have layer-specific data resulting in siloed processes and information. Moreover, the individual(s) conducting vulnerability management do not always have seamless visibility and operational control of the multiple layers of security available that might already be addressing a discovered risk. Therefore, in the absence of better information and processes, the only course for protection is to patch the vulnerability. While this approach appears simple, patching often is a complex operational process that is not easily carried out in large organizations. In addition, patching a particular vulnerability often is not the best security option given the context of the business requirements and other operational constraints.

Security and operations functions are still in the process of converging. Those responsible for performing a remediation task and those in the security organization have information needs that differ. This causes challenges when trying to facilitate a security process across functional areas. It is also very difficult to compare an already complex and challenging risk assessment process with the existing security countermeasures that are in place so that the optimal mitigation strategy is deployed. These tasks must also be carried out under the umbrella of corporate security policy. This gap creates exposure, duplication of effort, non-compliance and overall inefficiency and higher costs to secure the environment and comply with regulations.

Accordingly, there remains a need in the art to provide a solution that identifies risks and intelligently maps the attributes of those risks to the most effective countermeasures. These techniques and methods should make enterprise wide intelligence immediately actionable to mitigate risk while at the same time protecting against evolving threat vectors within a computing environment.

BRIEF SUMMARY

This disclosure describes a security countermeasures management platform (SCMP) that allows security and compliance users to view risks and vulnerabilities in their environment with the added context of what other mitigating security countermeasures are associated with that vulnerability and that are applicable and/or available within the overall security architecture. Additionally, the platform allows users to take one or more actions from controlling the operation of a security countermeasure for mitigation purposes (e.g., changing an Intrusion Prevention setting from "permit notify" to "block" or enabling disabled filters) to simply documenting the awareness of a security countermeasure that is in place.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 5 illustrates a representative countermeasure presentation display according to this disclosure;

FIG. 6 illustrates an alternative countermeasure presentation display according to another embodiment;

FIG. 7 illustrates additional display information that can be exposed to the user in the alternative embodiment of FIG. 6;

DETAILED DESCRIPTION

Figure 1:
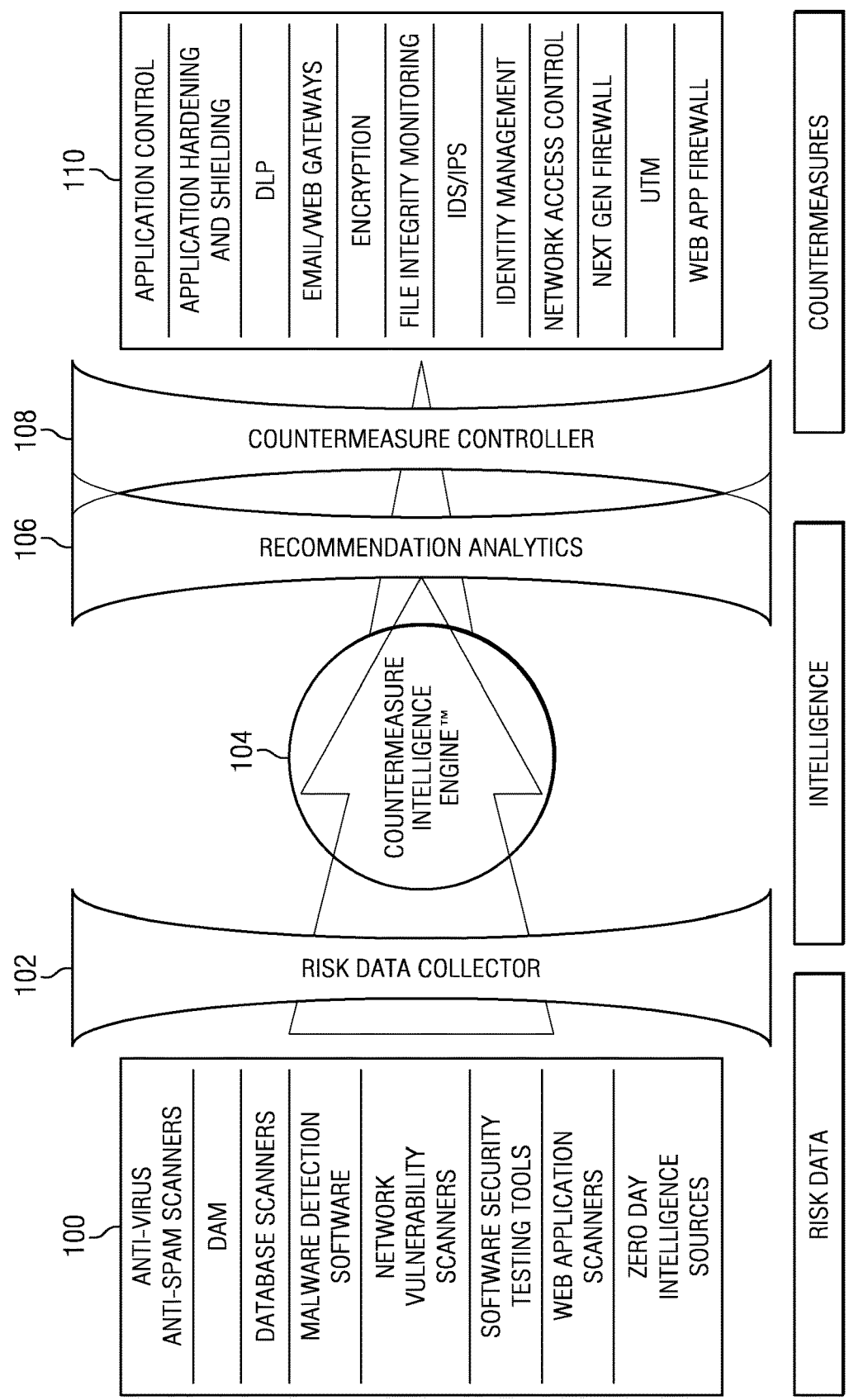
FIG. 1 illustrates a high level overview of the security countermeasure management platform architecture of this disclosure.

As used herein, the following terms have the following definitions:

"Vulnerability" refers to a weakness which allows an attacker to reduce a system's information assurance. Typically, vulnerability is a consequence of three elements: a system susceptibility or flaw, attacker access to the flaw, and attacker capability to exploit the flaw. To exploit the vulnerability, an attacker must have at least one applicable tool or technique that can connect to a system weakness.

"Risk data" refers to findings extracted from various risk tools such as, without limitation: network vulnerability scanners, web application scanners (dynamic application security testing), database scanners, antivirus scanners, software assurance scanners (static application security testing), anti-malware solutions, scanners of virtual environments, or automated penetration testing tools.

"Countermeasure" refers to a security solution designed to address a specific risk or set of risks to an enterprise. Typically, a countermeasure is deployed at various levels of the seven layer OSI stack as part of layered security architecture. Examples of countermeasures include, without limitation: next-generation firewall, host-based intrusion prevention, data leakage protection, encryption products, identity and access management, application shielding and gateway appliances.

"Cost" typically refers to hard and soft costs required to deploy a particular countermeasure. In one embodiment, cost is comprised of time spent identifying an issue and enacting the required configuration change within a countermeasure solution. Time may be a function of complexity or a relatively easy task that must be performed multiple times, or a combination of both. It may also include opportunity cost of other projects that are not advanced as a result as well as the potential operational impact of deploying the countermeasure (e.g., blocking important legitimate traffic or denying access to a business critical application)

"Effectiveness" refers to the technical ability of a countermeasure to directly remediate a risk. Thus, for example, filtering a port on a firewall is only partially effective, as many advanced persistent threats are masked inside of permitted traffic. But, an IPS filter designed to block SQL injection attacks is very effective in stopping that malicious traffic associated with a SQL injection attack.

"Value"—with respect to a countermeasure—refers to a weighted combination result of its cost to implement, and the level of its effectiveness in reducing risk. If a countermeasure is easy, and not costly to implement, and if it mitigates a multilayer risk to critical assets (e.g., malware that targets known software vulnerabilities in a key business application), it is highly valued. If, on the other hand, the countermeasure is costly to implement and has little risk reduction (e.g., a countermeasure that mitigates vulnerability on an internal machine with very limited access), it is considered to have lower value.

The platform may be implemented in a software-as-a-service (SaaS) or cloud-based model, or as a standalone product. More generally, the product or service is provided using a set of one or more computing-related entities (systems, machines, processes, programs, libraries, functions, interfaces, databases, data structures, and the like) that together facilitate or provide the inventive functionality. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. An interface typically is web-based. As described, the product or service may be implemented in a standalone server, or across a distributed set of machines. Typically, a server connects to the publicly-routable Internet, an intranet, a private network, or any combination thereof, depending on the desired implementation environment. The network may be wire-line, or wireless.

In general, the platform is associated with a computing environment (which itself includes systems, subsystems, devices, applications, databases, and the like) and preferably comprises a number of components. A user interface (typically web-based) provides the interface for a user to operate one or more aspects of the platform, from scanning the network to finding vulnerabilities, to selecting countermeasures(s) and providing reports. A core component is a taxonomy module having a countermeasure knowledge base (CMKB), which is a database for mapping exposures (vulnerabilities) to one or more associated or corresponding countermeasures that could address the exposure (i.e. countermeasure intelligence taxonomy) by grouping exposures to impact categories or classes that correspond to applicable countermeasures. For example, a vulnerability impacts that indicates a server logging failure would correspond to the countermeasure of file integrity monitoring and host intrusion prevention as another security countermeasure for addressing the same issue. The platform preferably also includes a countermeasure interoperability application programming interface (API) for collection of countermeasure data from different devices as well as for interacting with these devices, e.g., to enact a specific mitigating action. Preferably, the API also interfaces with one or more third party (or native) scanners to collect exposure information. As noted above, preferably the platform interface outputs (displays) the countermeasure options in the particular computing environment based on what is applicable but not discovered or available in the network. A countermeasure policy engine allows the user to deploy one or more countermeasure processes based on prescribed policies that may include, for example, control of a countermeasure for direct mitigation purposes, documentation of existing countermeasures for compliance purposes, and the like. In general, the platform may be configured to act on a vulnerability exposure by remediating the issue, by documenting an existing compensating countermeasure, by documenting risk exceptions, or the like.

As will be seen, by scanning or collecting of vulnerability exposures, the platform provides actionable results/options for the user to select the existing countermeasures for security protection and visibility as well as compliance auditing purposes. In use, the taxonomy module with its CMKB shows one or more corresponding countermeasures for an exposure. Then, via a policy module the user may apply a process either to select which countermeasure device (IPS, UTM, or the lie) is appropriate to mitigate the exposure (i.e. to control it) or, if not appropriate or possible, then to document what other means are existing in the network architecture that are protecting for the exposure (i.e., awareness). Preferably, the platform provides visibility to countermeasures that are applicable and available to discovered risks as well applicable countermeasures that are not currently available in the network; the latter provides the user with valuable information, namely, potential tools or devices to improve the security posture of the computing environment. Once a countermeasure is applied against an exposure, the decision to do so may be documented for compliance and audit purposes.

Preferably, the platform provides one or more countermeasure effectiveness ratings, and these ratings provide a quantitative method to compare the cost and effectiveness of applying a particular countermeasure to the reduction in risk that results. The platform preferably also provides one or more different types of reports to show risk reduction and effectiveness as well as the security posture of the computing environment.

FIG. 1 illustrates a high level overview of the platform architecture. As noted above, the security countermeasure management platform preferably is implemented in association with a computing environment that is to be monitored by the platform. The computing environment may be a third party enterprise computing environment that may be co-located with the platform in whole or in part, or it may be located remote from the platform. The platform may be accessed by authorized users in the computing environment using well-known authentication and authorization mechanisms. As seen in FIG. 1, typically the platform takes in risk data a via risk data collector 102, unifies the (often) multi-layer risk picture, and then maps it to applicable countermeasures. The risk inputs 100 may be quite varied but typically include, without limitation: network vulnerability scanner, web application scanners, software security testing tools, database scanners, malware detection solutions, anti-virus/anti-spam scanners, zero day intelligence sources, and configuration assessment tools. The active countermeasures intelligence (ACI) engine 104 (or Countermeasure Intelligence Engine™ or CIE™) provides a countermeasure deployment strategy to provide in-depth defense against discovered risks in the form of recommendation analytics 106, which are then applied to a countermeasure controller 108 to facilitate integration with countermeasure solutions. These countermeasure solutions 110 include, without limitation, network-based IDS/IPS, host-based IDS/IPS, secure e-mail gateways, secure web gateways, integrated security appliances, web application firewalls, network access control, endpoint protection platforms, virtual private network solutions, switches, routers, application control solutions, data loss prevention (DLP) solutions, managed file transfer solutions, file integrity monitoring, e-mail encryption, database encryption, and application hardening and shielding. Typically, the risk inputs and countermeasures comprise part of the computing environment. One or more risk inputs and the countermeasures may comprise part of the platform.

The ACI engine provides the basic functionality of implementing the risk-to-countermeasure taxonomy that identifies available and/or desired (if unavailable) countermeasures. The ACI engine provides an enhanced level of security information. Preferably, the engine leverages standards, such as CVE, CVSS, CWE and CAPEC, and combines risk perspectives from different layers of the computing stack, unifying them into a combined threat view to express impact attributes like injection vectors, methods of attack, and likelihood. From this unified view, the platform knowledge base implements a recommendation taxonomy that maps the connections between these risk and threat attributes to the most effective set of applicable countermeasure(s) for mitigating them. It is the information center that enables the ACI engine to converge a unified view of risks and threats with a unified layered defense capability. The engine can uncover hidden patterns in data, modeling possible outcomes and answering questions that are not surfaced by prior art techniques.

Figure 2:
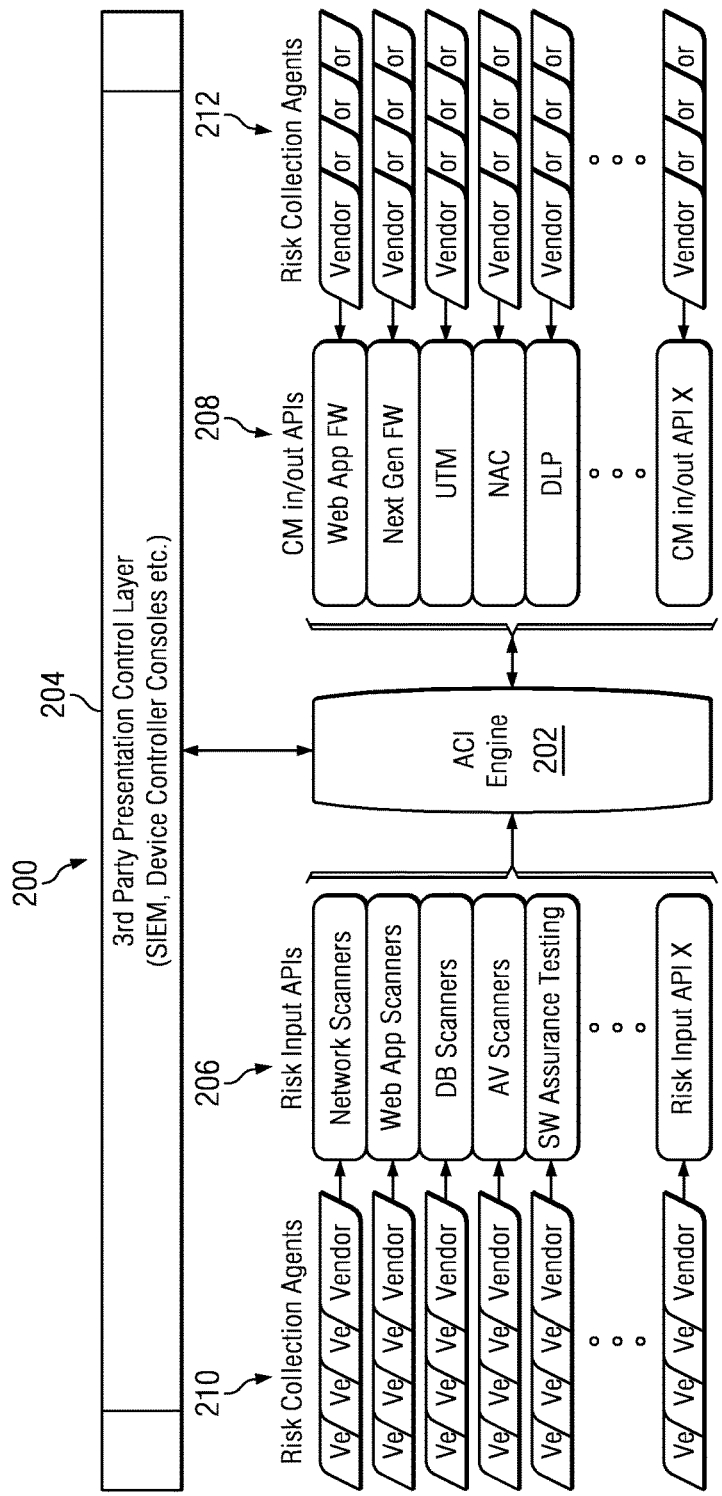
FIG. 2 illustrates the platform architecture in additional detail showing how the platform interfaces with various elements of a computing environment being managed by the platform.

FIG. 2 illustrates the platform architecture and its integration with the computing environment in additional detail. In this example, the platform 200 comprises the main ACI engine 202, a presentation control layer 204, a risk input API 206, and a countermeasure control API 208. The risk input API 206 interfaces to one or more risk collection agents 210. The risk collection agents are typically implemented in software and are designed to interact with risk assessment tools such as network scanners, web application scanners and antivirus scanners to request report data and feed it to risk input API 206 for normalization into the ACI engine 202. The risk input API 206 (and there may be multiple such interfaces) take the report data and apply business logic for processing and implementing the information into the CIE™ risk-to-countermeasure taxonomy. Preferably, a particular risk input API functions for a "class" of risk tools and supports multi-vendor imports within that class, e.g., network scanner input API, web application scanner input API, and the like. These APIs may be extended to provide operation of a given risk tool (e.g. kick off a scan) if desired. The countermeasure control API 208 interfaces to one or more ACI countermeasure control agents 212. A countermeasure control agent 212 typically is implemented in software and facilitates data exchange and configuration of functionality with one or more countermeasure devices. A countermeasure control agent preferably also extracts and passes risk knowledgebase information (e.g. IPS signatures) for processing into the CMKB database associated with the ACI engine.

Through use of the various application programming interfaces, the SCMP is an extensible platform for receiving data and orchestrating actions across multiple disparate risk input sources and countermeasure solutions. The platform is seamlessly integrated into existing software, hardware or web-based solutions.

Figure 3:
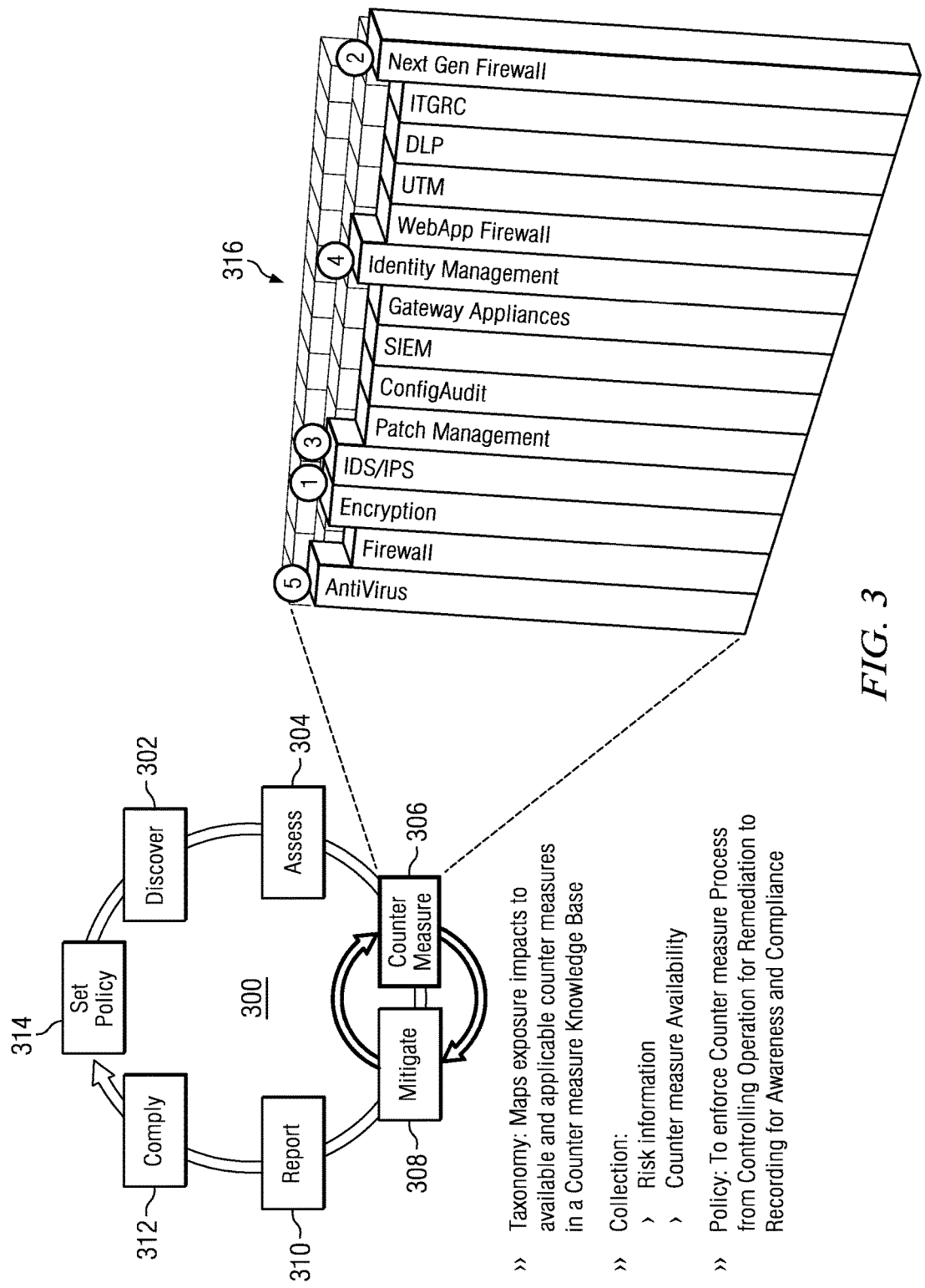
FIG. 3 illustrates the basic operations of the platform.

FIG. 3 illustrates the countermeasure awareness functionality of this disclosure as a series of operations. For illustration purposes only, the functionality is represented as a continuous cycle 300 that begins with a discovery phase 302, which is followed by an assessment phase 304. In one embodiment, the result of the assessment phase is the display of a set of one or more countermeasures 306, together with an indication of one or more mitigation actions 308. As illustrated, the countermeasures are identified (in the call-out of the figure), with one or more of the countermeasures ranked according to cost and/or effectiveness, as will be described in more detail below. The platform also provides for reporting 310, and compliance management 312, which facilitates the defining and setting of security policy 314 via a policy-based workflow configurator. The discovery phase 302 comprises the collection of both risk information and countermeasure availability information. The assessment phase 304 maps exposure impacts to available and applicable countermeasures using the knowledge base. The policy operation enforces a countermeasure process in one or more ways, e.g., controlling an operation for remediation, recording for awareness and compliance, and so forth. The analytics produce a countermeasure presentation 316, typically in the form of a display, wherein a set (or subset) of the countermeasures are identified as applicable and available, preferably ranked according to a cost attribute, an effectiveness attribute, or some combination thereof.

Figure 4:
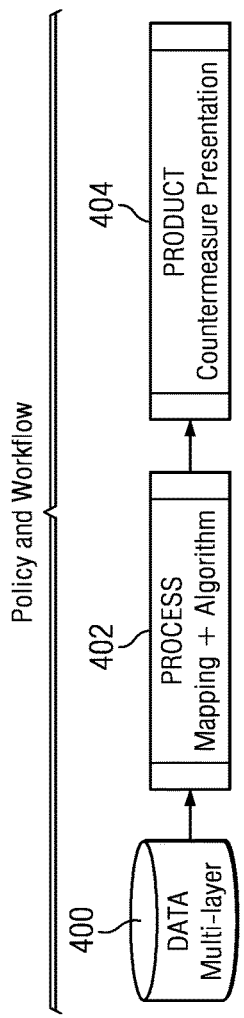
FIG. 4 provides a more detailed illustration of the discovery and assessment operations in FIG. 3.

FIG. 4 illustrates the data collection, assessment and display operations in more detail. The data collection 400 assimilates risk data received from one or more sources, typically representing one or more layers of the OSI protocol stack (e.g., application, transport, Internet, link, physical). Representative, but non-limiting examples include network scanners, application scanners, database scanners, code scanners, malware scanners, and the like. The assessment process 402 normalizes the collected data, identifies various industry-standard "identifiers," maps any applicable countermeasures to the risk data, and applies a ranking algorithm. The assessment process 402 preferably correlates threats across layers, processing the received risk data against the vulnerability-to-countermeasure knowledge base to discover, with respect to a particular vulnerability, one or more countermeasures applicable for potential remediation of the particular vulnerability. The countermeasure presentation operation 404 may use any display or programmatic interface. Typically, and with respect to the particular vulnerability, the operation 404 involves presenting information regarding the one or more discovered countermeasures. Preferably, the information identifies (i) an expected cost of implementing the discovered countermeasure, (ii) an expected effectiveness of implementing the discovered countermeasure, and (iii) an indication of whether the discovered countermeasure is available in the computing environment.

FIG. 5 illustrates a representative cost and/or effectiveness ranking provided by the ranking algorithm. In this example, the vulnerability is known, as evidenced by its industry standard CVE information 500. The vulnerability "2010-1850—MySQL—Buffer overflow" has been discovered by the discovery operation. MySQL is an open source database server. The information indicates that the buffer overflow vulnerability has been discovered in MySQL, and this vulnerability could allow an attacker to execute arbitrary code. The impact of the vulnerability is displayed in panel 501, described as security monitoring failure, loss of ability to control access, and the like. In the alternative, the impact data may be described using known industry standard (e.g., CVSS) scoring elements. The display also provides a countermeasure presentation that includes, for example, a countermeasure mitigation action, a list of applicable countermeasures found, and a list of applicable countermeasures that are not found. In this example, the assessment has identified two countermeasures 502 and 504 that are already in place (e.g., enable IPS filter and checkpoint firewall rule change), three applicable countermeasures 506, 508 and 510 (e.g., host IPS, DLP and database encryption) that are available, and one countermeasure 512 (e.g., active server logging) that is applicable but not available (found). Each countermeasure is associated with a display of its effectiveness and cost. Thus, the first option in the ranking is "enable IPS filter" which has an overall effectiveness rating of 9 and a relative cost of almost 6. This action detects an attempt to exploit the buffer overflow. The $2^{nd}$ ranked option, a firewall rule change, has a much lower effectiveness rating (4), and a slightly higher cost. The firewall rule change would operate to block untrusted access to the identified port. In this example, the effectiveness and cost values are displayed using a linear scale, although any convenient text and/or graphic metaphor may be used for this purpose.

The applicable countermeasures found include several that are identified. The applicable countermeasures not found include several that are might be used but are not present or available in the computing environment. The relative effectiveness and cost data are also displayed.

In this manner, a countermeasure presentation is provided to the user that presents a listing of applicable and available countermeasures for remediation of an identified vulnerability. The user can view and compare the cost and effectiveness rankings and then determine a best course of action in the event additional action is required.

FIG. 6 illustrates another display view of the countermeasure presentation. In this view, the user can select a particular vulnerability identified in a web-based report. Once selected, a display panel is overlaid identifying the vulnerability data, the impact data, and the one or more identified countermeasures. In this display mode, the applicable but unavailable countermeasure is shown as greyed out. When the user moves the display cursor over a particular countermeasure, additional information may be exposed to the user, such as shown in FIG. 7. The additional information may also afford the user with the option to apply the filter or add the filter to an existing collection.

According to another aspect, the platform also is adapted to receive additional data defining a policy-based countermeasure workflow associated with a particular countermeasure of the one or more discovered countermeasures to attempt to address the particular vulnerability. This is the set policy operation in FIG. 3. In addition to being defined, the policy-based countermeasure workflow also may be implemented to attempt to address the particular vulnerability using the particular countermeasure. Typically, the policy-based countermeasure workflow provides for one of: control of the particular countermeasure for mitigation of the vulnerability risk, documentation of the particular countermeasure for awareness purposes, and documentation of the particular countermeasure for configuration, compliance, audit and reporting purposes.

Figure 8:
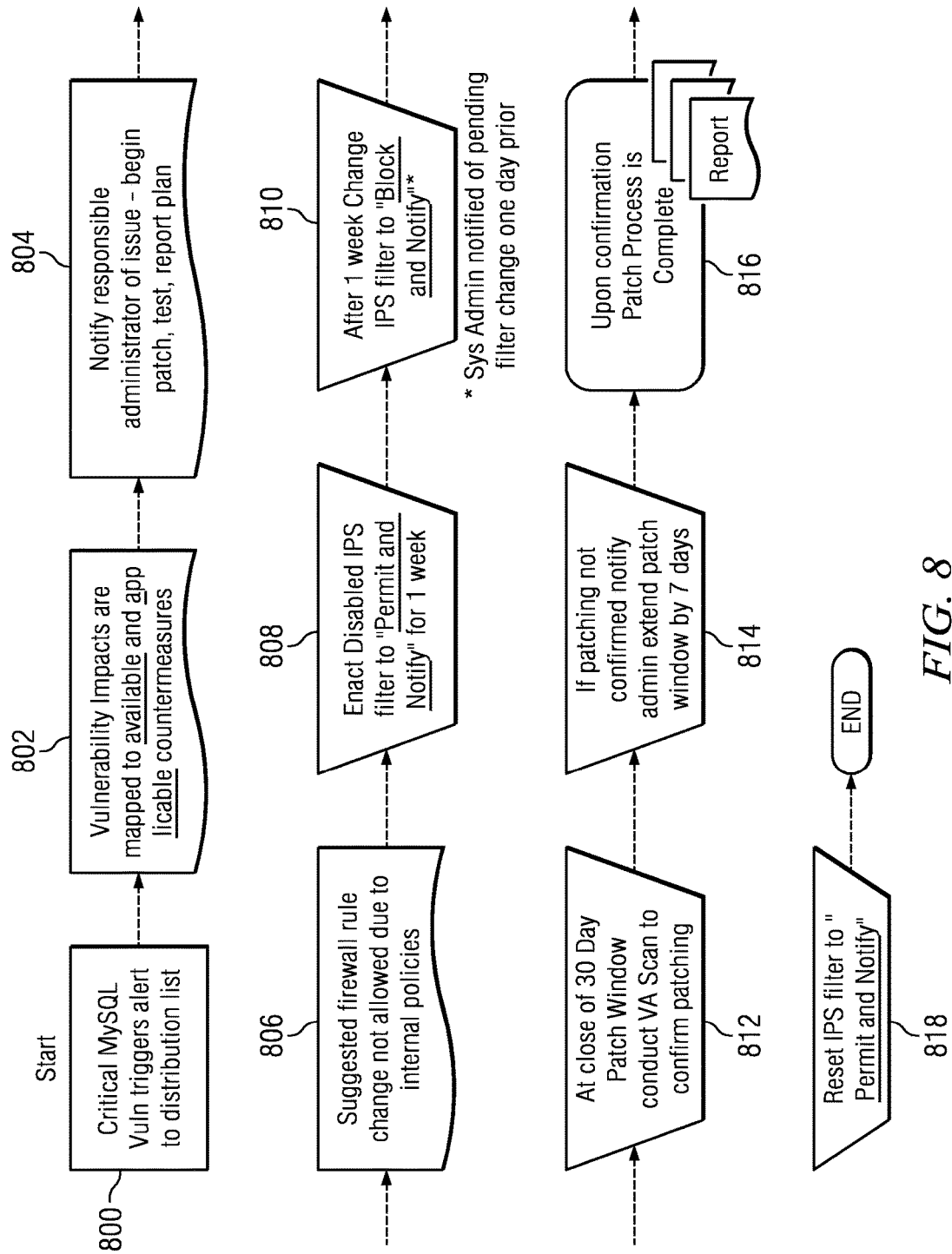
FIG. 8 illustrates a sample policy workflow that is enabled by the management platform.
Figure 9:
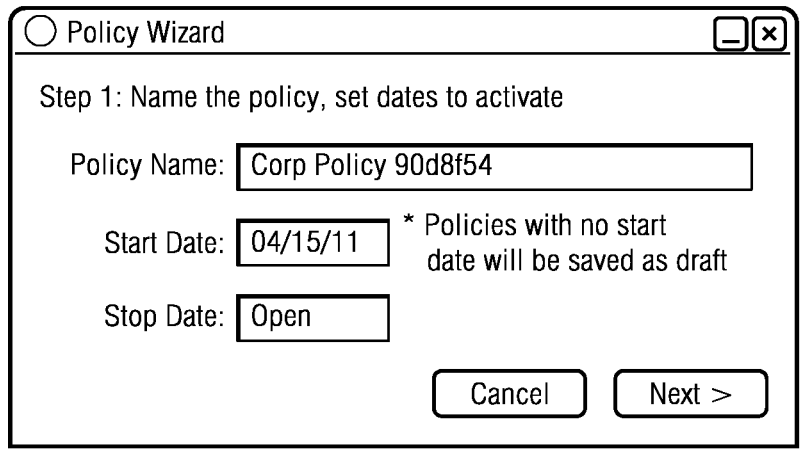
FIG. 9 is a first policy wizard for use in implementing the sample policy workflow.
Figure 10:
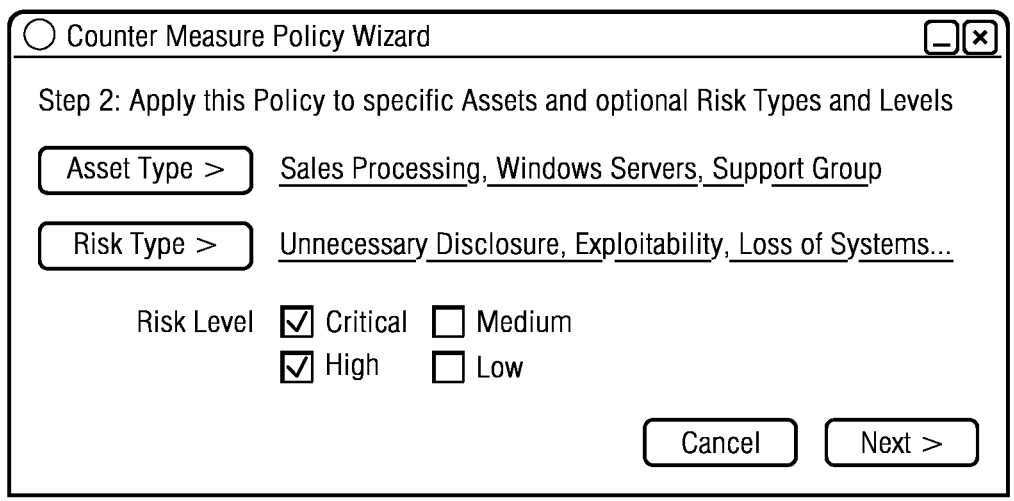
FIG. 10 is a second policy wizard for use in implementing the sample policy workflow.
Figure 11:
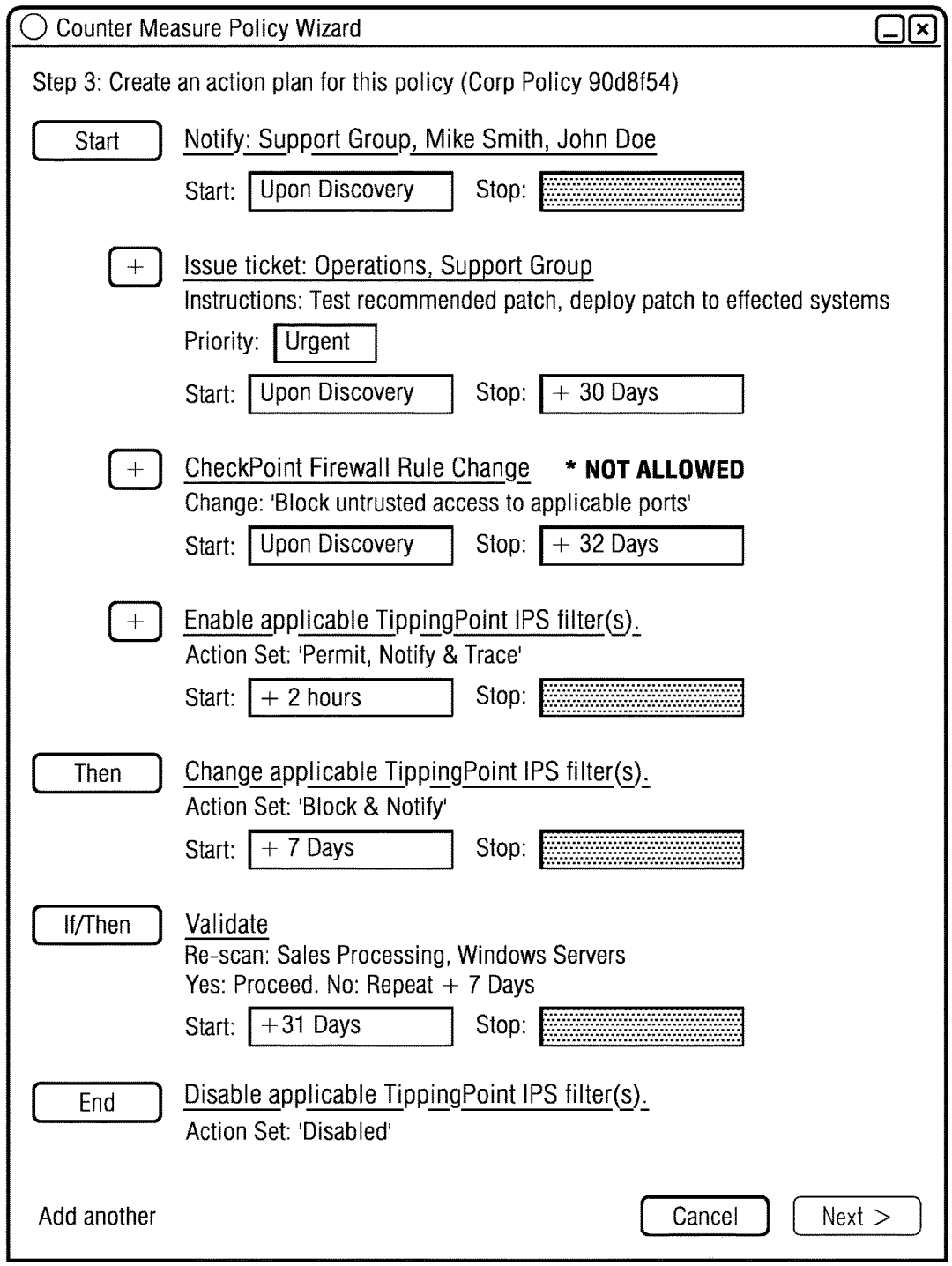
FIG. 11 is a third policy wizard for use in implementing the sample policy workflow.

FIG. 8 illustrates a sample policy workflow implemented by the platform. The workflow begins at 800 when an exposure (e.g., the MySQL vulnerability, such as described above) triggers an alert to a distribution list. In the alternative, the exposure is identified through the discovery process previously described. At step 802, the vulnerability impacts are mapped to the available and applicable countermeasures and the relevant information made available for action. In this example scenario, instead of displaying the countermeasure presentation a responsible administrator is notified of the issue. This is step 804. Upon notification, the administrator can create a patch/test/report plan. To this end, the platform informs the administrator that a suggested firewall rule change is not allowed, e.g., due to internal policies. This is step 806. Given the available information and system constraints, the administrator then configures a remediation plan. Thus, in this example scenario, the administrator provisions an alternative countermeasure (disabled IPS filter) and specifies one or more temporal or other constraints associated with the countermeasure. This is step 808. During this provisioning, the administrator also identifies one or more actions to take once the temporal constraint is reached. This is step 810. One or more additional operation 812, 814 and 816 are also specified as shown. The administrator then requests the platform to reset the countermeasure at step 818 and the process ends. FIGS. 9-11 illustrate sample GUI-based policy wizards for use to facilitate the above-described policy workflow. The three (3) distinct wizards may be implemented in a single display interface. Use of these policy configuration wizards is not meant to be limiting. The policy workflow may be generated programmatically or in any other convenient manner.

Figure 12:
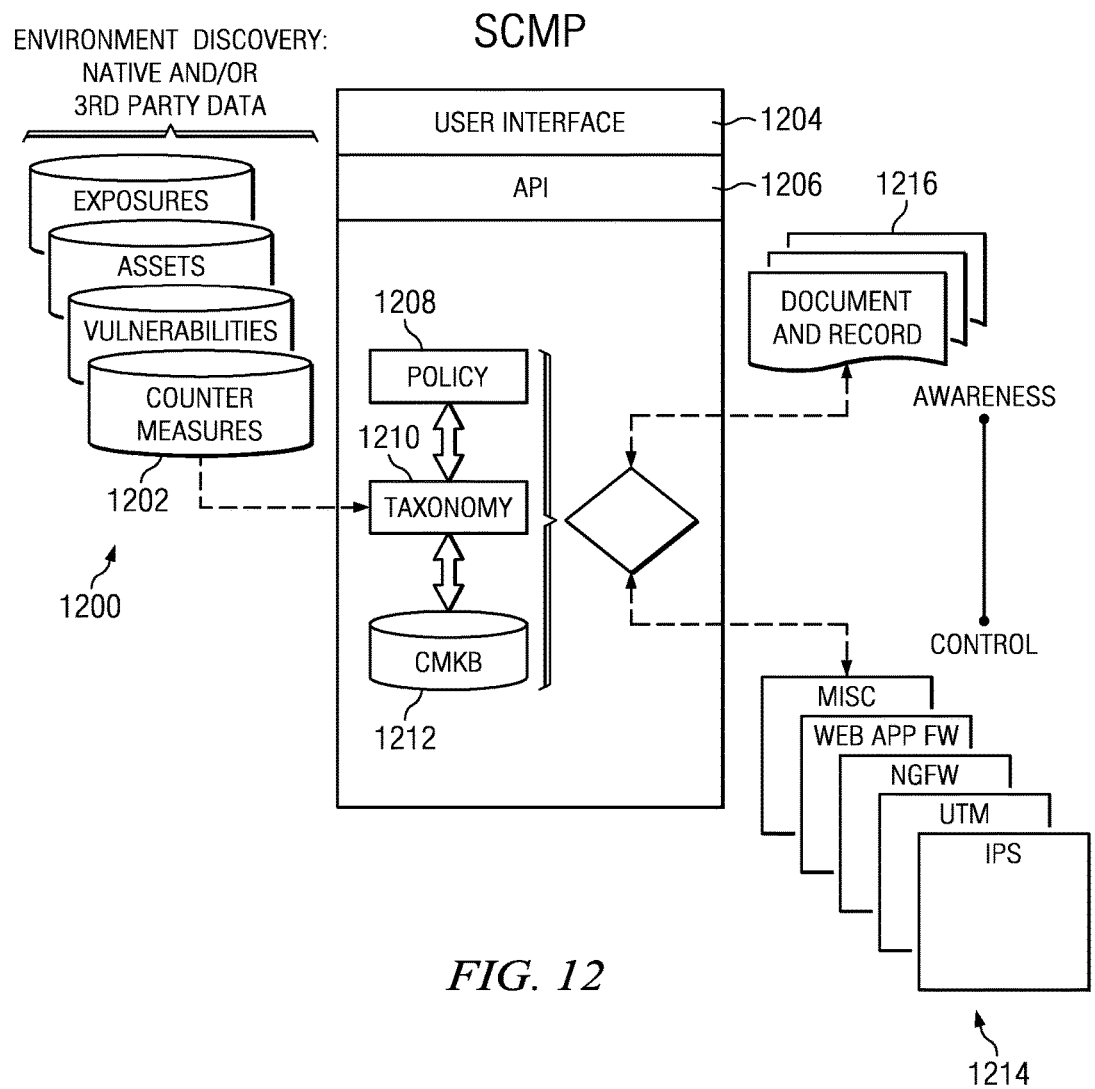
FIG. 12 is a further representation of the SCMP of this disclosure.

FIG. 12 illustrates an alternative representation of the security countermeasure management platform architecture. In this simplified embodiment, the risk data 1200 is collected at one or more layers of the computing stack and/or from third party sources. The countermeasure data 1202 (the available countermeasures) is collected via automated discovery, user—populated manual entry, programmatically, or some combination thereof. The platform itself provides a user interface 1204 for receiving information and exporting (preferably as a web interface) the countermeasure presentation(s), the API 1206 for interfacing with enterprise/third party computing system(s), the policy engine 1208, taxonomy 1210 and knowledge base 1212. As described above, the policy engine 1208 enables user to create various policies or rules that dictate how countermeasures are applied to discovered risks, preferably taking into account such factors as business impacts, asset criticalities, and the like. The policy engine provides an orchestration layer for driving operational control and/or documentation of the countermeasures. A particular policy may have a name, an owner, a start data, a modified date, a stop date, a list of edits or deletions to the policy, a list of assets associated therewith, an identification of countermeasure controls associated therewith, a listing of alerts, and one or more conditional events. These attributes and their associated values comprise a particular policy. The taxonomy 1210 and knowledge base 1212 associate the risk data and the applicable countermeasures. Preferably, risk data is normalized and layer-specific information is unified prior to mapping to the countermeasures database. Low level behaviors (such as those described by industry standards such as CPE, CCE, CWE, CVE, CEE and OVAL) may be unified into mid-level behaviors (such as specified by industry standard machine-language representations (e.g., CAPEC, MAEC, and the like) and then used to drive the high-level taxonomy against which the countermeasures are mapped. In the event (based on local resources) it is possible and feasible to provide countermeasure control, one or more controls 1214 may be implemented based on the discovered risk data. Some countermeasure control may occur automatically based on predetermined or preset rules; others may be available to the user to initiate from within the user interface 1204. In the event it is not possible or desirable to implement the control directly, a mechanism is provided for users to show the presence of countermeasures that exist to protect against a certain risk. This "awareness" functionality is illustrated at 1216.

The countermeasure knowledge base may be configured in any manner to associate risk data to associated or corresponding countermeasures that can address an exposure. Although not meant to be limiting, preferably the knowledge base is configured such exposures are grouped to impact categories or classes that correspond to applicable countermeasures in the form of the taxonomy 1210. For example, a vulnerability impact that indicates a server logging feature may correspond to the countermeasure of file integrity monitoring and host intrusion prevention as other security countermeasures for addressing the same issue. Of course, this is merely representative of the taxonomic approach. As already noted, preferably the platform provides the capability of interacting with countermeasure devices to enact a specific mitigating action (i.e. a countermeasure control). Using the policy engine, the user can define and deploy a policy-based countermeasure workflow to address risk the applicable and available countermeasures in the manner previously described.

As one of ordinary skill in the art will appreciate, the platform provides significant advantages. The platform unifies risk elements, articulates the attributes of those risks, and it intelligently maps the risks to the most-effective countermeasures to take action. In this manner, the techniques herein thus combine comprehensive risk intelligence with active mitigation. The approach transforms multiple sources of risk data in a physical and virtual environment into a unified insight across vulnerabilities, software weaknesses, and malware. The platform exposes to the user what security tools best address a given set of risks based on threat impact categories using a risk-to-countermeasure taxonomy for mapping exposures to corresponding countermeasures. The approach enables the user to dynamically tune and configure an enterprise's security architecture on a general threat landscape and on an enterprise's unique risk profile.

The platform enhances security awareness and intelligence to achieve a more advanced mitigation construct beyond simply patching a discovered vulnerability. It provides a more agile decision framework to enable users to prioritize resources on the most critical security issues in the computing environment in less time and with less effort as compared to prior art approaches. The platform eliminates duplication of efforts that exist when security tools are siloed with little shared information for the operator(s) of the tools. The active countermeasures intelligence (ACI) functionality also allows operators to clearly document their approach to mitigating risks across the entire security architecture (and not just whether a vulnerability is patched) when the option of patching or changing a configuration is not operationally possible or beneficial. This fulfills a key pain point in audit and compliance for documenting exceptions. It also lowers operation costs and frees-up valuable resources with the automation of security policies. The platform recommends a best defensive strategy based on a more comprehensive risk assessment. Preferably, it prioritizes resources on the most critical issues quickly and efficiently with a more agile mitigation decision framework.

The platform enables a user to understood and address a much higher level normalized view of risk across an entire information stack and to immediately initiate mitigation on the appropriate countermeasure solution(s) when faced with a exposure/thread.

By combining multiple layers of risk into a unified threat profile, the user can better understand and address risks across the physical and virtual enterprise. The approach also enables incorporation of advanced remediation intelligence that enables organizations to automate tasks confidently and within the context of security policy. The process enables the enterprise to manage vulnerabilities and to sustain compliance while streamlining processes and reducing costs.

The platform allows the user to take action—from controlling the operation of a security countermeasure for mitigation to simply documenting countermeasures that are in effect. The platform enables intelligent process orchestration using policy-based workflow from a range of manual, to quasi-automated to fully-automated countermeasure tasks.

As previously described, preferably the security countermeasure management platform is implemented as a managed service offering, although this is not a limitation. In such instance, a business entity customer of the service has a machine such as a workstation, notebook computer, tablet computer or mobile computing device. Typically, a business entity user accesses the service provider architecture by opening a web browser or web application on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. The service provider architecture upon which the management platform operates typically comprises an IP switch for traffic management, a set of one or more web server machines to export a front end (typically a set of web pages), a set of one more application server machines to provide the above-identified functionality, a database management system to manage the knowledge base, and a set of one or more specialized server machines for administration, management, billing and other management-related functions and operations. A representative web server machine comprises commodity hardware (e.g., Intel-based), an operating system such as Linux, and a web server such as Apache 2.x. A representative application server machine comprises commodity hardware, Linux, and an application server, such as WebLogic 9.2 (or later). The database management system may be implemented as an Oracle (or equivalent) database management package running on Linux. The SCMP infrastructure also may include a name service, FTP servers, load balancing appliances, other switches, and the like. Each machine typically comprises sufficient disk and memory, as well as input and output devices. The software environment on each machine includes a Java virtual machine (JVM) if control programs are written in Java. Of course, the particular hardware and software implementation details described herein are merely for illustrative purposes are not meant to limit the scope of the present invention. In a representative embodiment, a typical machine in the service infrastructure is a processor-based server running Linux. There are typically a set of such servers operating at a given location (e.g., an Internet data center).

In the alternative, the SCMP is implemented as a stand-alone product or system comprising machines, devices, programs, processes, databases, data structures, and the like in association with or as an adjunct to other computing resources in an environment. The solution may be implemented in whole or in part as an appliance-based offering, as a set of dedicated libraries (together with an SDK), as dedicated software, or the like.

The disclosed subject matter may be implemented within or in association with a vulnerability management system of the type described in commonly-owned U.S. Publication No. 2010/0242114, the entire disclosure of which is incorporated herein by reference. Familiarity with these known techniques is presumed.

Having described our invention, what we now claim is as follows.

The invention claimed is:

1. A method to improve an operation of a countermeasure computing system in a computing environment, comprising:
configuring a set of agents to collect information security risk data from one or more sources in the computing environment;
implementing a security countermeasure workflow to address a security exposure identified by the information security risk data from one or more sources by:
receiving the information security risk data from one or more sources in each of one or more distinct risk categories, each risk category associated with a distinct type;
augmenting the received information security risk data with other data to generate an aggregate risk entity, the other data being one of: information security standards data, and risk impact attribute data;
processing the aggregate risk entity against a vulnerability-to-countermeasure knowledge base that includes countermeasure attribute data to discover, with respect to the aggregate risk entity, one or more countermeasures applicable to address a security exposure as represented in the aggregate risk entity, the vulnerability-to-countermeasure knowledge base grouping vulnerabilities to impact categories that correspond to countermeasures; and
with respect to particular security exposure represented in the aggregate risk entity, presenting information regarding the one or more countermeasures, the information identifying (i) an expected cost of implementing a countermeasure, (ii) an expected effectiveness of implementing a countermeasure, (iii) an indication of whether a countermeasure is available in the computing environment, (iv) a list of one or more recommended countermeasure configuration settings, and (v) when multiple countermeasures are identified, an ordered ranking of the multiple countermeasures according to their respective effectiveness; and
based at least in part on the security countermeasure workflow, controlling a countermeasure mechanism in the countermeasure computing system to address the security exposure by performing at least one of the one or more presented countermeasures.

2. The method as described in claim 1 further including:
receiving additional data defining a policy-based countermeasure workflow associated with the one or more countermeasures to address the particular security exposure represented in the aggregate risk; and
implementing the policy-based countermeasure workflow.

3. The method as described in claim 2 wherein the policy based countermeasure workflow provides for one of: control of the particular countermeasure for remediation of mitigation of the vulnerability risk, documentation of the particular countermeasure for awareness purposes, and documentation of the particular countermeasure for configuration, compliance, audit and reporting purposes.

4. The method as described in claim 1 wherein the vulnerability-to-countermeasure knowledge base comprises a set of countermeasure data that is organized as a taxonomy.

5. The method as described in claim 1 wherein the information security risk data is received from one or more sources in each of two or more distinct risk categories, the information security risk data from at least a source in a first risk category being distinct from an uncorrelated to the information security risk data from a source in a second risk category.

6. The method as described in claim 5 wherein at least two of the sources are located across multiple layers of the multi-later OSI protocol stack.

7. The method as described in claim 2 where in policy-based countermeasure workflow automates a process of discovering a risk and addressing the risk using one of the available countermeasures based on a defined policy.

8. The method as described in claim 1 wherein the sources are one of: a network vulnerability scanner, a web application scanner, a software security testing tool, a database scanner, a malware detector, an anti-virus scanner, a zero-day intelligence source, and a configuration assessment tool.

9. The method as described in claim 1 wherein the countermeasure mechanism is one of: a network-based IDS/IPS, a host-based IDS/IPS, a secure e-mail gateway, a secure web gateway, an integrated security appliance, a web application firewall, a network access control, an endpoint protection platform, a virtual private network, a switch, a router, an application control device, a data loss prevention (DLP) device, a managed file transfer device, a file integrity monitor, an e-mail encryption device, a database encryption device, and an application hardening and shield device.

10. The method as described in claim 1 wherein the indication of whether the countermeasure is available in the computing environment includes presenting as greyed-out an applicable but unavailable countermeasure.

11. A method to improve an operation of countermeasure computing system in a computing environment, comprising:
   configuring a set of agents to collect information security risk data from one or more sources in the computing environment;
   implementing a security countermeasure workflow to address a security exposure identified by the information security risk data collected from the one or more sources by:
      receiving the information security risk data from one or more sources in each of one or more distinct risk categories, each risk category associated with a distinct type;
      augmenting the received information security risk data with other data to generate an aggregate risk entity, the other data being one of: information security standards data, and risk impact attribute data;
      processing the aggregate risk entity against a vulnerability-to-countermeasure knowledge base that includes countermeasure attribute data to discover, with respect to the aggregate risk entity, one or more countermeasures applicable to address a security exposure as represented in the aggregate risk entity, the vulnerability-to-countermeasure knowledge base grouping vulnerabilities to impact categories that correspond to countermeasures; and
      with respect to a particular security exposure represented in the aggregate risk entity, providing information regarding the one or more countermeasures, the information identifying one of: (i) an expected cost of implementing a countermeasure, (ii) an expected effected of implementing a countermeasure, (iii) an indication of whether a countermeasure is available in the computing environment, (iv) a list of one or more recommended countermeasure configuration settings, and (v) when multiple countermeasures are identified, an ordered ranking of the multiple countermeasures according to their respective effectiveness; and
   receiving additional data defining a policy-based countermeasure workflow associated with the one or more countermeasures to attempt to address the particular security exposure represented in the aggregate risk; and
   based at least in the part on the policy-based security countermeasure workflow, controlling a countermeasure mechanism in the countermeasure computing system to address the security exposure by performing at least one of the one or more countermeasures.

12. The method as described in claim 11 wherein the sources are one of: a network vulnerability scanner, a web application scanner, a software security testing tool, a database scanner, a malware detector, an anti-virus scanner, a zero-day intelligence source, and a configuration assessment tool.

13. The method as described in claim 11 wherein the countermeasure mechanism is one of: a network-based IDS/IPS, a host-based IDS/IPS, a secure e-mail gateway, a secure web gateway, an integrated security appliance, a web application firewall, a network access control, an endpoint protection platform, a virtual private network, a switch, a router, an application control device, a data loss prevention (DLP) device, a managed file transfer device, a file integrity monitor, an e-mail encryption device, a database encryption device, and an application hardening and shielding device.

14. The method as described in claim 11 wherein the indication of whether the countermeasure is available in the computing environment includes presenting as greyed-out an applicable but unavailable countermeasure.

\* \* \* \* \*